Aug. 5, 1930.          T. A. BECKER          1,772,201
                    SOLE PLATE FOR POINTS
                  Original Filed Nov. 10, 1928

Inventor:
Theodor A. Becker
By
    Attorney

Patented Aug. 5, 1930

1,772,201

UNITED STATES PATENT OFFICE

THEODOR A. BECKER, OF DUSSELDORF, GERMANY, ASSIGNOR TO VEREINIGTE STAHLWERKE AKTIENGESELLSCHAFT, OF DUSSELDORF, GERMANY

SOLE PLATE FOR POINTS

Original application filed November 10, 1928, Serial No. 318,472, and in Germany November 12, 1927. Divided and this application filed February 8, 1930. Serial No. 426,931.

The present invention relates to the manufacture of ribbed sole plates for points, and has for its object to provide an improved plate of that character.

According to the invention, longitudinally-ribbed, flat bars are produced by rolling, and pieces are then cut or stamped from the bars in lengths corresponding to the desired depth of the sole plate; a number of the separate pieces, according to the desired length of the sole plate, being arranged side by side and then welded to one another by any suitable welding process.

Figure 1:
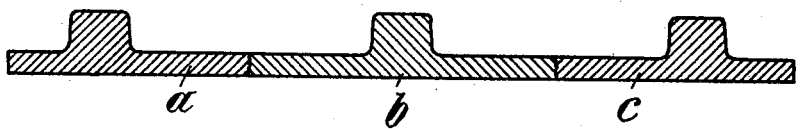
Figure 2:
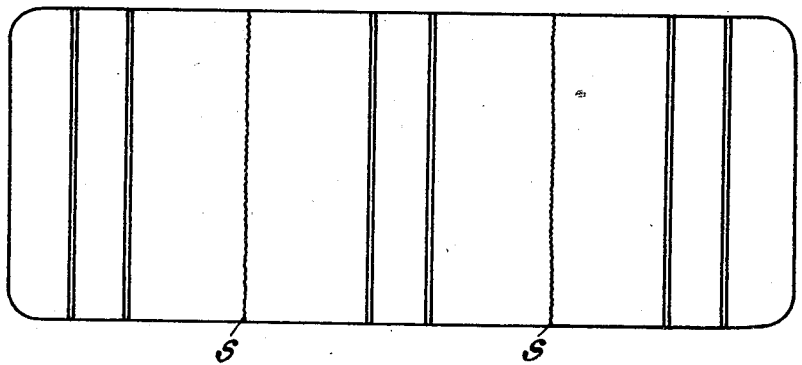

The invention is hereinafter described with reference to the accompanying diagrammatic drawing, in which:

Figure 1 is a section of a ribbed sole plate produced according to the invention; and Fig. 2 is a plan view corresponding to Fig. 1.

In carrying the invention into effect, a ribbed sole plate is constituted by a number of individual pieces $a$, $b$ and $c$ which are cut or stamped from rolled, flat bars of the desired cross-section in lengths corresponding to the desired depth of the sole plate. A number of the pieces are arranged side by side as shown, and are welded to one another along the lines $s$.

No claim is made herein for the method of making the plate, as the same forms the subject of my prior application, No. 318,472, filed November 10, 1928, and of which the present case is a division.

I claim as my invention:—

1. A ribbed sole plate for points, comprising a plurality of longitudinally-ribbed, coordinate parts having a length corresponding to the depth of the sole plate, welded together edge to edge.

2. A ribbed sole plate for points, comprising a plurality of individual, coordinate parts cut from rolled, flat bars, each part provided with a longitudinal rib; said parts being welded together edge to edge.

3. A ribbed sole plate for points, consisting of a plurality of individual, coordinate parts cut in lengths corresponding to the depth of the sole plate, from rolled, flat bars, each part having a central, longitudinally-extending rib; said parts being welded together edge to edge.

In testimony whereof I affix my signature.

THEODOR A. BECKER.